(12) United States Patent
Chen et al.

(10) Patent No.: US 11,368,206 B2
(45) Date of Patent: Jun. 21, 2022

(54) CONFIGURATION METHOD FOR BEAM FAILURE AND TERMINAL (71) Applicant: VIVO MOBILE COMMUNICATION CO., LTD., Guangdong (CN)

(72) Inventors: Li Chen, Chang'an Dongguan (CN); Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/035,024

(22) Filed: Sep. 28, 2020

(65) Prior Publication Data
US 2021/0013951 A1    Jan. 14, 2021

Related U.S. Application Data (63) Continuation of application No. PCT/CN2019/075677, filed on Feb. 21, 2019.

(30) Foreign Application Priority Data

Mar. 28, 2018 (CN) .......................... 201810266181.0

(51) Int. Cl.
*H04B 7/06* (2006.01)
*H04W 76/19* (2018.01)
(Continued)

(52) U.S. Cl.
CPC ...... *H04B 7/0695* (2013.01); *H04W 72/0466* (2013.01); *H04W 74/0833* (2013.01); *H04W 76/11* (2018.02); *H04W 76/19* (2018.02)

(58) Field of Classification Search
CPC ..... H04B 7/0695; H04B 7/088; H04W 48/08; H04W 48/20; H04W 74/0833;
(Continued)

(56) References Cited

U.S. PATENT DOCUMENTS

2018/0006770 A1   1/2018   Guo et al.
2018/0020487 A1   1/2018   Tsai et al.
(Continued)

FOREIGN PATENT DOCUMENTS

CN    107567038 A    1/2018
CN    107635242 A    1/2018
WO    2018/027904 A1  2/2018

OTHER PUBLICATIONS

Intel Corporation; "Remaining Issues on Beam Failure Recovery"; 3GPP TSG RAN WG1 Meeting #92 Athens, Greece, Feb. 26-Mar. 2, 2018; R1-1802397 (Year: 2018).*

(Continued)

*Primary Examiner* — Gary Mui
(74) *Attorney, Agent, or Firm* — Maschoff Brennan (57) ABSTRACT

A configuration method for beam failure and a terminal are provided, and the method includes: receiving notification signaling used to notify a change in a state of a cell, a cell group, or a carrier group; configuring at least one of a counter and a timer according to the change in the state of the cell, the cell group, or the carrier group, and/or, stopping a specific operation during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group.

18 Claims, 2 Drawing Sheets

(51) Int. Cl.
   *H04W 76/11*   (2018.01)
   *H04W 72/04*   (2009.01)
   *H04W 74/08*   (2009.01)

(58) Field of Classification Search
   CPC ..... H04W 76/11; H04W 76/15; H04W 76/19; H04W 76/27
   See application file for complete search history.

(56) References Cited

U.S. PATENT DOCUMENTS

| | | | |
|---|---|---|---|
| 2019/0215712 A1* | 7/2019 | Babaei | H04L 5/0092 |
| 2019/0274098 A1* | 9/2019 | Cheng | H04W 76/19 |
| 2019/0281480 A1* | 9/2019 | Wei | H04W 24/08 |
| 2019/0305840 A1* | 10/2019 | Cirik | H04W 72/085 |
| 2020/0374960 A1* | 11/2020 | Deenoo | H04W 72/14 |
| 2020/0413395 A1* | 12/2020 | Chen | H04W 76/19 |
| 2021/0028853 A1* | 1/2021 | Wu | H04W 56/001 |
| 2021/0168631 A1* | 6/2021 | Chen | H04W 76/19 |
| 2021/0282211 A1* | 9/2021 | Pezeshki | H04W 72/044 |

OTHER PUBLICATIONS

Qualcomm; "Beam failure recovery procedure"; 3GPP TSG-RAN WG1 #92b Sanya, China, Apr. 16-Apr. 20, 2018; R1-1804788 (Year: 2018).*
CATT; "Beam Failure Detection"; 3GPP TSG-RAN WG2#101 Athens, Greece, Feb. 26-Mar. 2, 2018; R2-1802142 (Year: 2018).*
MediaTek Inc.; "Clarifications on Beam Failure Recovery Procedure" 3GPP TSG-RAN2#101 Athens, Greece, Feb. 26-Mar. 2, 2018; R2-1802406 (Year: 2018).*
Nokia, Nokia Shanghai Bell; "Beam failure detection and recovery"; 3GPP TSG-RAN WG2 Meeting #101 Athens, Greece, Feb. 26-Mar. 2, 2018; R2-1803230 (Year: 2018).*
"Clarification for the use of en-gNB in LTE Stage-2" Change Request, 3GPP TSG-RAN WG2 #101, Feb. 26, 2018.
"Clarification on HRL for EN-DC" Change Request, 3GPP TSG-RAN2 Meeting #101, Feb. 26, 2018.
"Stage 2 alignment for NSA Energy Savings" Change Request, 3GPP TSG-RAN WG2 Meeting #101, Feb. 26, 2018.
"E-UTRA—NR Cell Resource Coordination" Change Request, 3GPP TSG-RAN2 Meeting #101, Feb. 26, 2018.
"Introduction of EN-DC capabilities" Change Request, 3GPP TSG-RAN2 Meeting #101, Feb. 26, 2018.
"Miscellaneous corrections" Change Request, 3GPP TSG-RAN2 Meeting #101, Feb. 26, 2018.
"Baseline CR for TS 37.340 (RAN3 part) covering agreements of RAN3 #NR adhoc 1801 and RAN3 #99" Change Request, 3GPP TSG-RAN2 Meeting #101, Feb. 26, 2018.
"Miscellaneous Corrections & Additions" Change Request, 3GPP TSG-RAN2 Meeting #101, Feb. 26, 2018.
"Updates on UE capabilities" Change Request, 3GPP TSG-RAN2 Meeting #101, Feb. 26, 2018.
"General corrections on TS 38.321" Change Request, 3GPP TSG-RAN2 Meeting #101, Feb. 26, 2018.
"Introduction of MAC CEs for NR MIMO" Change Request, 3GPP TSG-RAN2 Meeting #101, Feb. 26, 2018.
"3rd Generation Partnership Project; Technical Specification Group Radio Access Network; NR; Medium Access Control (MAC) protocol specification (Release 15)" 3GPP TS 38.321 V2.0.0, Dec. 2017.
"Corrections for RLC specification" Change Request, 3GPP TSG-RAN2 Meeting #101, Feb. 26, 2018.
"Corrections to PDCP specification" Change Request, 3GPP TSG-RAN2 Meeting #101, Feb. 26, 2018.
"Presentation of Specification/Report to TSG: TS 38.321, Version 2.0.0" 3GPP TSG-RAN Meeting #78, Dec. 18, 2017.
"NR related CRs", 3GPP TSG-RAN Meeting #79, Mar. 19, 2018.
Written Opinion and International Search Report in Application No. PCT/CN2019/075677 dated Oct. 8, 2020.
European Search Report dated Apr. 6, 2021, as received in application No. 19777082.9.
"UE behaviours upon beam failure and recovery" 3GPP TSG-RAN WG2 Meeting #101, R2-1801892, Athens, Greece, Feb. 26-Mar. 2, 2018. ASUSTek.
"Discussion on the impact on beam failure recovery" 3GPP TSG-RAN WG2 Meeting #101, R2-1802006, Athens, Greece, Feb. 26-Mar. 2, 2018. VIVO.
"Beam failure detection and recovery" 3GPP TSG-RAN WG2 Meeting #101, R2-1803230, Athens, Greece, Feb. 26-Mar. 2, 2018. Nokia.
"Discussion on the SCell BFR" 3GPP TSG-RAN WG2 Meeting #101 bis, R2-1804696, Sanya, China, Apr. 16-Apr. 20, 2018. VIVO.

* cited by examiner

CONFIGURATION METHOD FOR BEAM FAILURE AND TERMINAL

CROSS-REFERENCE TO RELATED APPLICATION

This application is a continuation application of a PCT Application No. PCT/CN2019/075677 filed on Feb. 21, 2019, which claims priority to a Chinese patent application No. 201810266181.0 filed in China on Mar. 28, 2018, the disclosure of which is incorporated herein by reference in its entirety.

TECHNICAL FIELD

The present disclosure relates to the field of communications technologies, and in particular, related to a configuration method for beam failure and a terminal.

BACKGROUND

In $5^{th}$ generation (5th generation, 5G) communication systems, vulnerability of a link leads to beam failure in high-frequency communications. Beam failure detection is currently achieved by counting beam failure instances (beam failure instance) through at least one of a counter and a timer, so as to implement the beam failure detection. In addition, in a carrier aggregation (Carrier Aggregation, CA) scenario, a cell to which a terminal is connected may include a primary cell (Primary Cell, PCell) and a secondary cell (Secondary Cell, SCell). Optionally, two cell groups, i.e., a master cell group (Master Cell Group, MCG) and a secondary cell group (Secondary Cell Group, SCG) may be included in a newly introduced dual connectivity (Dual Connectivity, DC) architecture in a 5G communication system, and the MCG may include a PCell and one or more SCells, and the SCG may include a primary secondary cell (Primary Secondary Cell, PSCell) and one or more SCells, wherein both PCell and PSCell may be referred to as special cells (Special Cell, SpCell). However, at present, neither a beam failure detection procedure nor a beam failure recovery procedure takes into account a case that a state change occurs in a cell, a cell group, or a carrier group, such as the SCell being deactivated or reactivated, or the SCG being reconfigured. This results in poor performance of beam failure detection or beam failure recovery performed by the terminal.

SUMMARY

Embodiments of the present disclosure provide a configuration method for beam failure and a terminal, so as to address a problem that a performance of a terminal for beam failure detection or beam failure recovery is poor.

In order to address the technical problem described above, the present disclosure is implemented as follows.

A configuration method for beam failure applied to a terminal includes: receiving a notification signaling used to notify a change in a state of a cell, a cell group, or a carrier group; configuring at least one of a counter and a timer according to the change in the state of the cell, the cell group, or the carrier group, and/or, stopping a specific operation during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group.

In a first aspect, an embodiment of the present disclosure further provides a configuration method for beam failure, and the method is applied to a terminal and includes: receiving a notification signaling used to notify a change in a state of a cell, a cell group, or a carrier group; configuring at least one of a counter and a timer according to the change in the state of the cell, the cell group, or the carrier group, and/or, stopping a specific operation during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group.

In a second aspect, an embodiment of the present disclosure further provides a terminal, and the terminal includes: a reception module, used for receiving a notification signaling used to notify a change in a state of a cell, a cell group, or a carrier group; and a processing module, used for configuring at least one of a counter and a timer according to the change in the state of the cell, the cell group, or the carrier group, and/or, stopping a specific operation during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group.

In a third aspect, an embodiment of the present disclosure provides a terminal, the terminal includes a storage, a processor, and a program stored on the storage and executable by the processor, wherein in a case that the computer program is executed by the processor, the processor implements steps of the configuration method for beam failure provided in an embodiment of the present disclosure.

In a fourth aspect, an embodiment of the present disclosure provides a computer readable storage medium, a computer program is stored on the computer readable storage medium, wherein in a case that the computer program is executed by a processor, the processor implements steps of the configuration method for beam failure provided in an embodiment of the present disclosure.

In an embodiment of the present disclosure, a notification signaling used to notify a change in a state of a cell, a cell group or a carrier group is received; at least one of a counter and a timer is configured according to the change in the state of the cell, the cell group, or the carrier group, and/or, a specific operation is stopped during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group. Since corresponding processing is performed according to the change in the state of the cell, the cell group, or the carrier group, performance of the terminal for beam failure detection or beam failure recovery may be improved in the embodiments of the present disclosure compared to the related art that do not take into account the change in the state of the cell, the cell group, or the carrier group.

DETAILED DESCRIPTION

The technical solutions of embodiments of the present disclosure will be clearly and completely described below with reference to the drawings of embodiments of the present disclosure, apparently, the described embodiments are some embodiments of the present disclosure, but are not all the embodiments. Based on embodiments of the present disclosure, all other embodiments derived by a person of ordinary skill in the art without any creative efforts shall fall within the scope of the present disclosure. A term "and/or" in the specification and claims indicates at least one of objects connected by the term.

Figure 1:
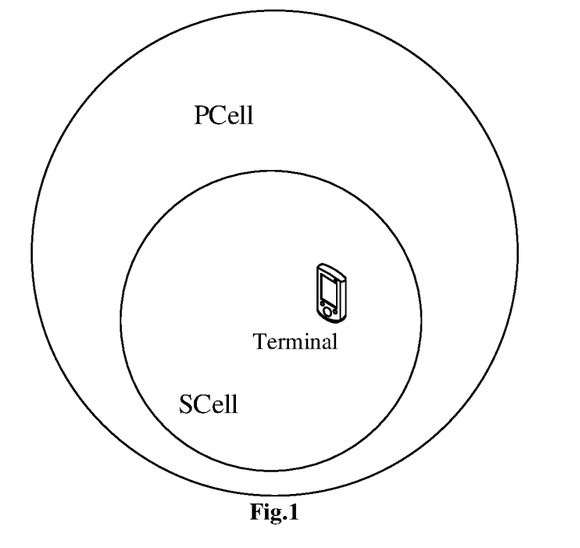
FIG. 1 is a structural diagram of a network system to which an embodiment of the present disclosure is applicable.

Referring to FIG. 1, FIG. 1 is a structural diagram of a network system to which an embodiment of the present disclosure may be applied. As shown in FIG. 1, a terminal and at least one cell are included, wherein the terminal may be a user equipment (User Equipment, UE) or other terminal device, such as a mobile phone, a tablet personal computer (Tablet Personal Computer), a laptop computer (Laptop Computer), a personal digital assistant (Personal Digital Assistant, PDA), a mobile internet device (Mobile Internet Device, MID), or a wearable device (Wearable Device) and other terminal-side devices, it should be noted that a specific type of the terminal is not limited in an embodiment of the present disclosure. The terminal may be within coverage area of one or more cells and may be connected to one or more cells concurrently. In addition, at least one of the cells may include a SCell, as well as also a primary cell, wherein the SCell may be a SCell in a CA scenario, or may be a SCell in an MCG or an SCG in a DC architecture. The primary cell may be a PCell in a CA scenario, or may be a PCell in an MCG in a DC architecture, or may be a PSCell in an SCG, or may be a SpCell. In addition, the SCell and the primary cell may correspond to a same base station, or in some scenarios, the SCell and the primary cell may correspond to different base stations, which is not limited. It should be noted that, in the drawings, a case in which the at least one cell includes the PCell and the SCell is taken as an example.

Figure 2:
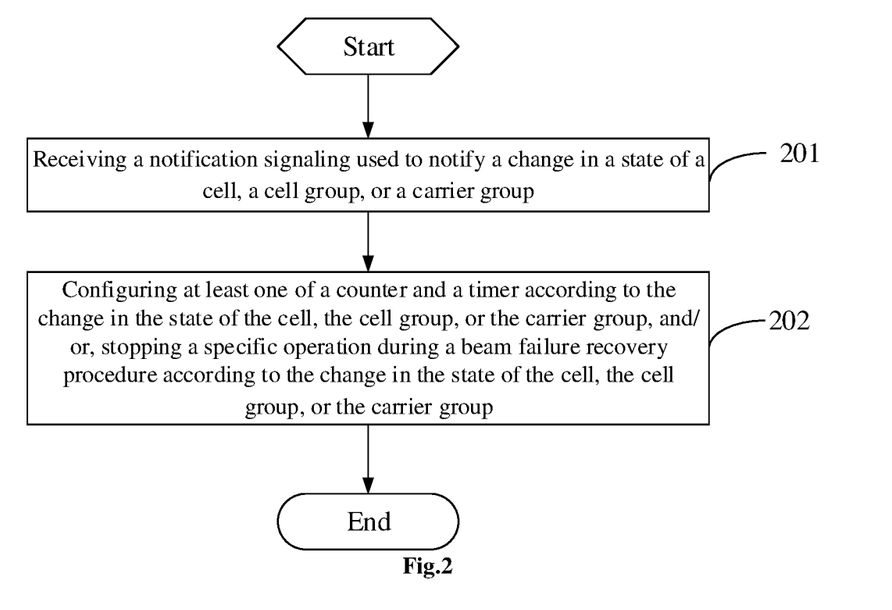
FIG. 2 is a flowchart of a configuration method for beam failure provided in an embodiment of the present disclosure.

Referring to FIG. 2, FIG. 2 is a flowchart of a configuration method for beam failure provided in an embodiment of the present disclosure. The method is applied to a terminal, as shown in FIG. 2, the method includes the following steps 201-202.

Step 201: receiving a notification signaling used to notify a change in a state of a cell, a cell group, or a carrier group.

The change in the state of the cell, the cell group, or the carrier group may be configured by a base station for the terminal, for example, the base station activates a carrier group for the terminal, or the base station deactivates a carrier group for the terminal, or the base station activates a cell for the terminal, or the base station deactivates a cell for the terminal, or the base station reconfigures a cell for the terminal, or the base station changes a cell group or a cell for the terminal, and so on. In addition, after the base station performs the above configuration for the terminal, the base station notifies the terminal via the notification signaling, for example, the base station notifies the terminal via a radio resource control (Radio Resource Control, RRC) signaling, of course, the base station may notify the terminal via other signaling, which is not limited. In addition, it should be noted that the base station used to notify the terminal may be a base station of the cell, the cell group or the carrier group as described above, of course, the base station may also be a base station that has certain relationship with the cell, the cell group or the carrier group as described above, which is not limited.

Step 202: configuring at least one of a counter and a timer according to the change in the state of the cell, the cell group, or the carrier group, and/or, stopping a specific operation during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group.

The counter and the timer are a counter and a timer used for beam failure detection and configured in the terminal, and the counter and the timer may correspond to one or more cells, or may correspond to one or more carrier groups, or may correspond to one or more cell groups. That is, the terminal may configure a counter and a timer for a cell (or a cell group or a carrier group), or may configure a common counter and a common timer for multiple cells (or multiple cell groups or multiple carrier groups), which is not limited. Configuring at least one of the counter and the timer includes: resetting at least one of the counter and the timer or keeping at least one of the counter and the timer running, etc. Since at least one of the counter and the timer may be configured in Step 202 according to the change in the state of the cell, the cell group, or the carrier group, performance of the terminal for beam failure detection may be improved compared to the related art that do not take into account the change in the state of the cell, the cell group, or the carrier group.

It should be noted that, configuring at least one of the counter and the timer according to the change in the state of the cell, the cell group, or the carrier group includes: configuring, according to the change in the state of the cell, at least one of the counter and the timer configured by the terminal for the cell; configuring, according to the change in the state of the cell group, at least one of the counter and the timer configured by the terminal for one or more cells in the cell group; and/or configuring, according to the change in the state of the carrier group, at least one of the counter and the timer configured by the terminal for one or more cells in the carrier group. In addition, the terminal may configure a common counter and a common timer for multiple cells in the cell group, or may configure different counters and different timers for different cells in the cell group. Similarly, the terminal may configure a common counter and a common timer for multiple cells in the carrier group, or may configure different counters and different timers for different cells in the carrier group.

In addition, stopping the specific operation during the beam failure recovery procedure may be stopping a certain operation during the beam failure recovery procedure, for example, stopping monitoring a scrambled physical downlink control channel (Physical Downlink Control Channel, PDCCH) or stopping a random access procedure used for beam failure recovery (Beam Failure Recovery, BFR), etc. Since the specific operation is stopped during the beam failure recovery procedure in Step 202, in this way, it may be avoided that the terminal continues, in a case that the state of the cell, the cell group, or the carrier group changes, to perform an entire beam failure recovery procedure, so as to achieve effects such as reducing power consumption of the terminal and saving transmission resources, thereby improving performance of the terminal for beam failure recovery.

It should be noted that the above beam failure recovery procedure may be a beam failure recovery procedure of the SCell. Of course, the above beam failure recovery procedure may also be a beam failure recovery procedure of the primary cell, or the above beam failure recovery procedure may also be a beam failure recovery procedure of a certain carrier group.

As an optional implementation manner, the change in the state of the cell includes: a condition of the cell being activated, the cell being deactivated, the cell being reactivated, or the cell being changed.

Change in the state of the cell group includes: a condition of the cell group being activated, the cell group being configured, the cell group being reconfigured, or the cell group being changed.

Change in the state of the carrier group includes: a condition of the carrier group being activated, the carrier group being deactivated, the carrier group being reactivated, or the carrier group being changed.

The cell includes at least one of a SCell and a primary cell, and the cell group is at least one of an SCG and a MCG.

In the implementation, it may be implemented that at least one of the counter and the timer is configured in a case that the SCell and/or the primary cell is activated, deactivated, reactivated or changed, and/or, the specific operation is stopped during the beam failure recovery procedure in a case that the SCell and/or the primary cell is activated, deactivated, reactivated or changed, thereby improving performance of the terminal for beam failure detection or beam failure recovery.

It may also be implemented that at least one of the counter and the timer is configured in a case that the SCG and/or the MCG is activated, deactivated, reactivated or changed, and/or, the specific operation is stopped during the beam failure recovery procedure in a case that the SCG and/or the MCG is activated, deactivated, reactivated or changed, thereby improving performance of the terminal for beam failure detection or beam failure recovery.

It may also be implemented that at least one of the counter and the timer is configured in a case that the carrier group is activated, deactivated, reactivated or changed, and/or, the specific operation is stopped during the beam failure recovery procedure in a case that the carrier group is activated, deactivated, reactivated or changed, thereby improving performance of the terminal for beam failure detection or beam failure recovery.

It should be noted that, in an embodiment of the present disclosure, the primary cell may include at least one of: a PCell, a PCell in the MCG, a PSCell in the SCG, and a SpCell.

In an embodiment, the terminal configures a counter and a timer for the SCell, and configures a counter and a timer for the primary cell.

Configuring at least one of the counter and the timer includes at least one of: resetting at least one of the counter and the timer configured by the terminal for the SCell or keeping at least one of the counter and the timer configured by the terminal for the SCell running, in a case that the SCell is activated, deactivated or reactivated; resetting at least one of the counter and the timer configured by the terminal for the primary cell or keeping at least one of the counter and the timer configured by the terminal for the primary cell running, in a case that the primary cell is reconfigured or changed; resetting at least one of the counter and the timer configured by the terminal for the SCell or keeping at least one of the counter and the timer configured by the terminal for the SCell running, in a case that the primary cell is reconfigured or changed; resetting at least one of a counter and a timer configured by the terminal for at least one cell in the SCG or keeping at least one of a counter and a timer configured by the terminal for at least one cell in the SCG running, in a case that the SCG is activated, configured, or reconfigured; resetting at least one of a counter and a timer configured by the terminal for at least one cell in the MCG or keeping at least one of a counter and a timer configured by the terminal for at least one cell in the MCG running, in a case that the MCG is reconfigured or changed; resetting at least one of a counter and a timer configured by the terminal for at least one cell in the SCG or keeping at least one of a counter and a timer configured by the terminal for at least one cell in the SCG running, in a case that the MCG is reconfigured or changed.

In the implementation, since it may be implemented that at least one of the counter and the timer configured by the terminal for the SCell is reset in a case that the SCell is activated, deactivated or reactivated, a case is avoided that at least one of the counter and the timer configured for the SCell continues to count after the SCell is activated, deactivated or reactivated, so as to avoid an unwanted beam failure detection result, thereby improving performance of terminal for beam failure detection. For example, the timer and/or the counter used for beam failure detection on the corresponding cell is reset in a case that the SCell is activated, deactivated or reactivated, or a PCell (or a SpCell/PSCell) is reconfigured or changed. In addition, at least one of the counter and timer configured by the terminal for the SCell may be kept running in a case that the SCell is activated, deactivated or reactivated, so that it may be implemented that beam failure recovery may be triggered more quickly in special scenarios (e.g., scenarios where the PCell and the SCell have more similar channel conditions) to improve performance of the terminal. For example, the timer and/or the counter used for beam failure detection on the corresponding cell is kept running in a case that the S Cell is deactivated or reactivated, or a PCell (or a SpCell/PSCell) is changed.

In addition, it may also be implemented that at least one of the counter and the timer configured by the terminal for the primary cell and the Scell is reset or at least one of the counter and the timer configured by the terminal for the primary cell is kept running, in a case that the primary cell is reconfigured or changed. An unwanted beam failure detection result is avoided, so as to improve performance of terminal for beam failure detection, and it may be implemented that beam failure recovery may be triggered more quickly in special scenarios (e.g., scenarios where the PCell and the SCell have more similar channel conditions) to improve performance of the terminal.

In addition, it may also be implemented that the above configuration is performed in a case that the SCG is activated, configured or reconfigured, or the MCG is reconfigured or changed, so that an unnecessary beam failure detection result may be avoided, so as to improve performance of terminal for beam failure detection, and it may be implemented that beam failure recovery may be triggered more quickly in special scenarios (e.g., scenarios where the PCell and the SCell have more similar channel conditions) to improve performance of the terminal. For example, the timer and/or the counter used for beam failure detection corresponding to some or all of cells in the SCG/MCG is reset in a case that the SCG/MCG is configured, reconfigured or changed. As another example, the timer and/or the counter used for beam failure detection corresponding to some or all of cells in the SCG/MCG is kept running in a case that the SCG/MCG is configured, reconfigured or changed.

In addition, it should be noted that, in an embodiment of the present disclosure, optionally, the resetting the timer and/or the counter or keeping the timer and/or the counter running may be that the counter is reset while the timer is kept running On one hand, an unnecessary beam failure detection result may be avoided so as to improve performance of terminal for beam failure detection, and on the other hand, beam failure recovery may be triggered more quickly to improve performance of the terminal.

Of course, in an embodiment of the present disclosure, it may also be possible that a timer and a counter is configured for a carrier group. In this way, at least one of the counter and the timer configured by the terminal for the carrier group is reset, or, at least one of the counter and the timer configured by the terminal for the carrier group is kept running, in a case that the carrier group is activated, deactivated or reactivated. Similarly, an unnecessary beam failure detection result may be avoided so as to improve performance of terminal for beam failure detection, and beam failure recovery may be triggered more quickly to improve performance of the terminal.

In another embodiment, the terminal configures a common counter and a common timer for the SCell and the primary cell.

Configuring at least one of the counter and the timer includes at least one of: resetting at least one of the counter and the timer or keeping at least one of the counter and the timer running, in a case that the SCell is activated, deactivated, or reactivated; resetting at least one of the counter and the timer or keeping at least one of the counter and the timer running, in a case that the primary cell is reconfigured or changed; or, resetting at least one of a counter and a timer configured by the terminal for at least one cell in the SCG, and/or, keeping at least one of a counter and a timer configured by the terminal for at least one cell in the SCG running, in a case that the SCG is activated, configured, or reconfigured; resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

Configuring the common counter and the common timer for the SCell and the primary cell may be understood as a case that, the terminal enables the SCell to share a set of counters and timers with the primary cell. Overhead of the terminal may be reduced by eliminating a need to configure too many counters and timers, and beam failure recovery may also be triggered more quickly to improve performance of the terminal.

In the present embodiment, it may be implemented that at least one of the counter and the timer is reset or kept running in a case that the SCell is activated, deactivated or reactivated, or the primary cell is reconfigured or changed. In this way, it may be implemented that an unnecessary beam failure detection result is avoided so as to improve performance of terminal for beam failure detection, and beam failure recovery may be triggered more quickly to improve performance of the terminal. For example, the timer and/or the counter used for beam failure detection is kept running in a case that the SCell is activated, deactivated or reactivated. The timer and/or the counter used for beam failure detection is reset in a case that a PCell (or a SpCell/a PSCell) is reconfigured or changed.

It may also be implemented that at least one of a counter and a timer configured by the terminal for at least one cell in the SCG is reset, and/or, at least one of a counter and a timer configured by the terminal for at least one cell in the SCG is kept running in a case that the SCG is activated, configured, or reconfigured or the MCG is reconfigured or changed. In this way, it may be implemented that an unnecessary beam failure detection result is avoided so as to improve performance of terminal for beam failure detection, and beam failure recovery is triggered more quickly to improve performance of the terminal.

It should be noted that, in an embodiment of the present disclosure, at least one cell in the SCG described above refers to some or all of cells in the SCG. For example, the timer and/or the counter used for beam failure detection on some or all of cells in the corresponding SCG is reset, and/or, the timer and/or the counter used for beam failure detection on some or all of cells is kept running, in a case that the SCG is reconfigured or the MCG is changed.

In another embodiment, the cell includes multiple SCells, the terminal configures a common counter and a common timer for the multiple SCells.

Configuring at least one of the counter and the timer includes at least one of: resetting at least one of the counter and the timer or keeping at least one of the counter and the timer running in a case that at least one SCell in the multiple SCells is activated, deactivated, or reactivated; resetting at least one of a counter and a timer configured by the terminal for at least one cell in the SCG, and/or, keeping at least one of a counter and a timer configured by the terminal for at least one cell in the SCG running in a case that the SCG is activated, configured, or reconfigured; resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

Configuring the common counter and the common timer for the multiple SCells may be understood as a case that the terminal enables the multiple SCells to share a set of counters and timers. Overhead of the terminal may be reduced by eliminating a need to configure too many counters and timers, and beam failure recovery may also be triggered more quickly to improve performance of the terminal.

In the implemented, it may be implemented that at least one of the counter and the timer is reset or kept running in a case that at least one SCell in the multiple SCells is activated, deactivated or reactivated. In this way, it may be implemented that an unnecessary beam failure detection result is avoided so as to improve performance of terminal for beam failure detection, and beam failure recovery may be triggered more quickly to improve performance of the terminal.

It may also be implemented that at least one of a counter and a timer configured by the terminal for at least one cell in the SCG is reset and/or kept running, in a case that the SCG is activated, configured, or reconfigured or the MCG is reconfigured or changed. In this way, it may be implemented that an unnecessary beam failure detection result is avoided so as to improve performance of terminal for beam failure detection, and beam failure recovery may be triggered more quickly to improve performance of the terminal.

As another optional implementation, stopping the specific operation includes at least one of: stopping monitoring a scrambled PDCCH in the SCell; stopping monitoring to a scrambled PDCCH in the primary cell; stopping a random access procedure used for beam failure recovery.

In the implementation, it may be implemented that monitoring a scrambled PDCCH in the SCell is stopped, monitoring a scrambled PDCCH in the primary cell is stopped, and/or, a random access procedure used for beam failure recovery is stopped according to the change in the state of the cell, the cell group, or the carrier group, according to the change in the state of the cell, the cell group or the carrier group. In this way, it may be avoided that the terminal continues to perform a complete beam failure recovery procedure in a case that a state of a cell, a cell group, or a carrier group changes, so as to achieve effects such as reducing power consumption of the terminal and saving transmission resources, thereby improving performance of the terminal for beam failure recovery.

Optionally, the scrambled PDCCH in the SCell includes: a PDCCH scrambled with a cell radio network temporary identifier (Cell Radio Network Temporary Identifier, C-RNTI) in the SCell. The scrambled PDCCH in the primary cell includes a PDCCH scrambled with a C-RNTI in the primary cell.

Of course, a manner for the scrambling is not limited in the present disclosure, e.g., other network identifiers may also be used for scrambling.

Optionally, stopping monitoring the scrambled PDCCH in the SCell includes: stopping, in a case that the beam failure recovery procedure is performed on one or more SCells in multiple SCells included in the cell, monitoring a scrambled PDCCH in the at least one SCell. Stopping the random access procedure used for beam failure recovery includes: stopping, in a case that the beam failure recovery procedure is performed on the SCell, a random access procedure used for beam failure recovery in the S Cell; or stopping, in a case that the beam failure recovery procedure is performed on the primary cell, a random access procedure used for beam failure recovery in the primary cell; or stopping, in a case that the beam failure recovery procedure is performed on the SCell and the primary cell respectively, a random access procedure used for beam failure recovery in the SCell and the primary cell.

Stopping monitoring the scrambled PDCCH in the one or more SCells may be that monitoring a scrambled PDCCH in a SCell, on which the beam failure recovery procedure is performed, in the multiple SCells is stopped only, while the terminal may continue monitoring scrambled PDCCHs in other SCells, thereby improving performance of the terminal. Optionally, stopping monitoring the scrambled PDCCH in the one or more SCells may be that, monitoring scrambled PDCCHs in all SCells in the multiple SCells is stopped. In this way, by stopping monitoring scrambled PDCCHs in all SCells, effects, such as reducing power consumption of the terminal and saving transmission resources, may be achieved, thereby improving performance of the terminal for beam failure recovery.

In addition, in the implementation, it may also be implemented that a random access procedure used for beam failure recovery in the SCell is stopped in a case that the beam failure recovery procedure is performed on the SCell. Of course, monitoring a scrambled PDCCH in the SCell may also be stopped and/or monitoring a scrambled PDCCH in the primary cell may also be stopped, in a case that the beam failure recovery procedure is performed on the SCell.

Optionally, the beam failure recovery procedure may be a beam failure recovery for the SCell, that is, the beam failure recovery procedure may be a procedure of recovering from a beam failure on the SCell. For example, if a beam failure recovery for the SCell is performed on the SCell, at least one of the following steps is performed in a case that the SCell is activated, deactivated or reactivated or, in a case that the SCG is configured or reconfigured or the MCG is changed: stopping monitoring a PDCCH scrambled with a C-RNTI in the SCell; stopping monitoring a PDCCH scrambled with a C-RNTI in the PCell (or a SpCell/a PSCell); stopping a random access procedure used for BFR in the SCell.

Optionally, stopping the random access procedure used for beam failure recovery in the SCell includes at least one of: stopping sending a preamble in the SCell; stopping monitoring a message msg2 of the random access procedure in the SCell; stopping sending a message msg3 of the random access procedure in the SCell; stopping monitoring a message msg4 of the random access procedure in the SCell.

In addition, in the implementation, it may also be implemented that a random access procedure used for beam failure recovery in the primary cell is stopped in a case that the beam failure recovery procedure is performed on the primary cell. Of course, monitoring a scrambled PDCCH in the SCell may also be stopped and/or monitoring a scrambled PDCCH in the primary cell may also be stopped in a case that the beam failure recovery procedure is performed on the primary cell.

Optionally, the beam failure recovery procedure may be a beam failure recovery for the SCell. For example, if a beam failure recovery for the SCell is performed on the PCell (or a SpCell/a PSCell), at least one of the following steps is performed in a case that the SCell is activated, deactivated or reactivated, or, in a case that the SCG is configured or reconfigured or the MCG is changed: stopping monitoring a PDCCH scrambled with a C-RNTI in the SCell; stopping monitoring a PDCCH scrambled with a C-RNTI in the PCell (or a SpCell/a PSCell); stopping a random access procedure used for BFR in the PCell (or a SpCell/a PSCell).

Optionally, stopping the random access procedure used for beam failure recovery in the primary cell includes at least one of: stopping sending a preamble in the primary cell; stopping monitoring a message msg2 of the random access procedure in the primary cell; stopping sending to a message msg3 of the random access procedure in the primary cell; stopping monitoring a message msg4 of the random access procedure in the primary cell.

In addition, in the implementation, it may also be implemented that random access procedure for beam failure recovery in the SCell and the primary cell is stopped in a case that the beam failure recovery procedure is performed on the SCell and the primary cell, respectively. Performing the beam failure recovery procedure on the SCell and the primary cell respectively may be that, a message (msg) 1 and a msg2 during a contention-free random access (Contention-Free Random Access, CFRA) process are sent on the SCell and received the PCell, respectively; or, a msg1, a msg2, a msg3, and a msg4 during the contention based random access (Contention Based Random Access, CBRA) process are sent on the SCell and received on the PCell (or a SpCell/a PSCell), respectively.

Optionally, the beam failure recovery procedure may be beam failure recovery for the SCell. For example, if a beam failure recovery for the SCell is performed on the SCell+ PCell (or a SpCell/a PSCell), at least one of the following steps is performed in a case that the SCell is activated, deactivated or reactivated, or in a case that the SCG is configured or reconfigured or the MCG is changed: stopping monitoring a PDCCH scrambled with a C-RNTI in the SCell; stopping monitoring a PDCCH scrambled with a C-RNTI in the PCell (or a SpCell/a PSCell); stopping a random access procedure used for BFR in the SCell+PCell (or a SpCell/a PSCell).

Optionally, stopping the random access procedure used for beam failure recovery in the SCell and the primary cell includes at least one of following: stopping sending a preamble in the SCell; stopping sending a preamble in the primary cell; stopping monitoring a message msg2 of the random access procedure in the SCell; stopping monitoring a message msg2 of the random access procedure in the primary cell; stopping sending a message msg3 of the random access procedure in the S Cell; stopping sending a message msg3 of the random access procedure in the primary cell; stopping monitoring a message msg4 of the random access procedure in the SCell; stopping monitoring a message msg4 of the random access procedure in the primary cell.

It should be noted that, the method may be applied in either 5G or 4G systems, which is not limited. The method is applicable to other communication systems, e.g., 6G systems or other communication systems where beam failure detection or beam failure recovery is applied, etc., as long as substantially the same functionality may be achieved.

In an embodiment of the present disclosure, a notification signaling used to notify a change in a state of a cell, a cell group or a carrier group is received; at least one of a counter and a timer is configured according to the change in the state of the cell, the cell group, or the carrier group, and/or, a specific operation is stopped during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group. Since corresponding processing is performed according to the change in the state of the cell, the cell group, or the carrier group, performance of the terminal for beam failure detection or beam failure recovery may be improved in the embodiments of the present disclosure compared to the related art that do not take into account the change in the state of the cell, the cell group, or the carrier group.

Figure 3:
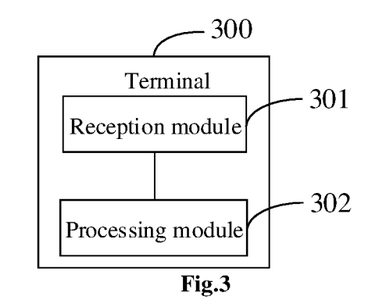
FIG. 3 is a structural diagram of a terminal provided in an embodiment of the present disclosure.

Referring to FIG. 3, FIG. 3 is a structural diagram of a terminal provided in an embodiment of the present disclosure. As shown in FIG. 3, the terminal 300 includes: a reception module 301, used to receive a notification signaling used to notify a change in a state of a cell, a cell group, or a carrier group; a processing module 302, used to configure at least one of a counter and a timer according to the change in the state of the cell, the cell group, or the carrier group, and/or, stop a specific operation during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group.

Optionally, the change in the state of the cell includes: a condition of the cell being activated, the cell being deactivated, the cell being reactivated, or the cell being changed.

Change in the state of the cell group includes: a condition of the cell group being activated, the cell group being configured, the cell group being reconfigured, or the cell group being changed.

Change in the state of the carrier group includes: a condition of the carrier group being activated, the carrier group being deactivated, the carrier group being reactivated, or the carrier group being changed.

The cell includes at least one of a Secondary Cell (SCell) and a primary cell, and the cell group is at least one of a Secondary Cell Group (SCG) and a Master Cell Group (MCG).

Optionally, the terminal configures a counter and a timer for the SCell, and configures a counter and a timer for the primary cell.

Configuring at least one of the counter and the timer includes at least one of: resetting at least one of the counter and the timer configured by the terminal for the SCell or keeping at least one of the counter and the timer configured by the terminal for the SCell running, in a case that the SCell is activated, deactivated or reactivated; resetting at least one of the counter and the timer configured by the terminal for the primary cell or keeping at least one of the counter and the timer configured by the terminal for the primary cell running, in a case that the primary cell is reconfigured or changed; resetting at least one of the counter and the timer configured by the terminal for the SCell or keeping at least one of the counter and the timer configured by the terminal for the SCell running, in a case that the primary cell is reconfigured or changed; resetting at least one of a counter and a timer configured by the terminal for at least one cell in the SCG or keeping at least one of a counter and a timer configured by the terminal for at least one cell in the SCG running, in a case that the SCG is activated, configured, or reconfigured; resetting at least one of a counter and a timer configured by the terminal for at least one cell in the MCG or keeping at least one of a counter and a timer configured by the terminal for at least one cell in the MCG running, in a case that the MCG is reconfigured or changed; resetting at least one of a counter and a timer configured by the terminal for at least one cell in the SCG or keeping at least one of a counter and a timer configured by the terminal for at least one cell in the SCG running, in a case that the MCG is reconfigured or changed.

Optionally, the terminal configures a common counter and a common timer for the SCell and the primary cell.

Configuring at least one of the counter and the timer includes at least one of: resetting at least one of the counter and the timer or keeping at least one of the counter and the timer running, in a case that the SCell is activated, deactivated, or reactivated; resetting at least one of the counter and the timer or keeping at least one of the counter and the timer running, in a case that the primary cell is reconfigured or changed; or, resetting at least one of a counter and a timer configured by the terminal for at least one cell in the SCG, and/or, keeping at least one of a counter and a timer configured by the terminal for at least one cell in the SCG running, in a case that the SCG is activated, configured, or reconfigured; resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

Optionally, the cell includes multiple SCells, the terminal configures a common counter and a common timer for the multiple SCells.

Configuring at least one of the counter and the timer includes at least one of: resetting at least one of the counter and the timer or keeping at least one of the counter and the timer running in a case that at least one SCell in the multiple SCells is activated, deactivated, or reactivated; resetting at least one of a counter and a timer configured by the terminal for at least one cell in the SCG, and/or, keeping at least one of a counter and a timer configured by the terminal for at least one cell in the SCG running in a case that the SCG is activated, configured, or reconfigured; resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

Optionally, stopping the specific operation includes at least one of: stopping monitoring a scrambled PDCCH in the SCell; stopping monitoring to a scrambled PDCCH in the primary cell; stopping a random access procedure used for beam failure recovery.

Optionally, stopping monitoring the scrambled PDCCH in the SCell includes: stopping, in a case that the beam failure recovery procedure is performed on at least one SCell in multiple SCells included in the cell, monitoring a scrambled PDCCH in one or more SCells. Stopping the random access procedure used for beam failure recovery includes: stopping, in a case that the beam failure recovery procedure is performed on the SCell, a random access procedure used for beam failure recovery in the S Cell; or stopping, in a case that the beam failure recovery procedure is performed on the primary cell, a random access procedure used for beam failure recovery in the primary cell; or stopping, in a case that the beam failure recovery procedure is performed on the SCell and the primary cell respectively, a random access procedure used for beam failure recovery in the SCell and the primary cell.

Optionally, stopping the random access procedure used for beam failure recovery in the SCell and in the primary cell includes at least one of: stopping sending a preamble in the SCell; stopping sending a preamble in the primary cell; stopping monitoring a msg2 of the random access procedure in the SCell; stopping monitoring a msg2 of the random access procedure in the primary cell; stopping sending a msg3 of the random access procedure in the SCell; stopping sending a msg3 of the random access procedure in the primary cell; stopping monitoring a msg4 of the random access procedure in the SCell; stopping monitoring a msg4 of the random access procedure in the primary cell.

The scrambled PDCCH in the SCell includes: a PDCCH scrambled with a cell radio network temporary identifier (Cell Radio Network Temporary Identifier, C-RNTI) in the SCell. The scrambled PDCCH in the primary cell includes a PDCCH scrambled with a C-RNTI in the primary cell.

Optionally, the primary cell includes at least one of: a primary cell PCell, a PCell in the MCG, a PSCell in the SCG, and a SpCell.

The terminal provided in an embodiment of the present disclosure is able to implement various processes implemented by the terminal in the method embodiment of FIG. 2, which will not be repeated herein to avoid repetition. Performance of the terminal for beam failure detection or beam failure recovery may be improved.

Figure 4:
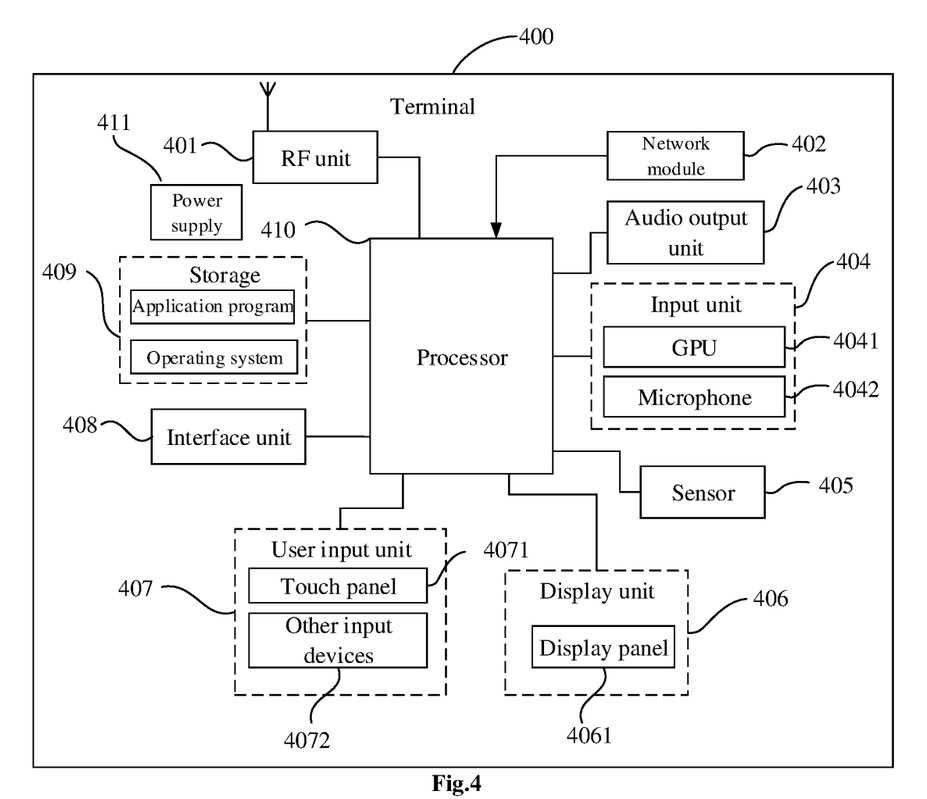
FIG. 4 is another structural diagram of a terminal provided in an embodiment of the present disclosure.

FIG. 4 is a schematic structural diagram of a terminal according to various embodiments of the present disclosure.

A terminal 400 includes, but is not limited to, a radio frequency unit 401, a network module 402, an audio output unit 403, an input unit 404, a sensor 405, a display unit 406, a user input unit 407, an interface unit 408, a storage 409, a processor 910, and a power supply 911 and other components. Those skilled in the art may understand that the structure of the terminal shown in FIG. 4 does not form a limitation of the terminal, the terminal may include more or fewer components than shown in the figure, or some combined components, or different arrangements of components. In some embodiments of the present disclosure, the terminal includes, but is not limited to, a mobile phone, a tablet computer, a notebook computer, a palmtop computer, a vehicle-mounted terminal, a wearable device, a pedometer, and the like.

The radio frequency unit 401 is used to receive a notification signaling used to notify a change in a state of a cell, a cell group, or a carrier group.

The processor 410 is used to configure at least one of a counter and a timer according to the change in the state of the cell, the cell group, or the carrier group, and/or, stop a specific operation during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group.

Optionally, the change in the state of the cell includes: a condition of the cell being activated, the cell being deactivated, the cell being reactivated, or the cell being changed.

Change in the state of the cell group includes: a condition of the cell group being activated, the cell group being configured, the cell group being reconfigured, or the cell group being changed.

Change in the state of the carrier group includes: a condition of the carrier group being activated, the carrier group being deactivated, the carrier group being reactivated, or the carrier group being changed.

The cell includes at least one of a Secondary Cell (SCell) and a primary cell, and the cell group is at least one of a Secondary Cell Group (SCG) and a Master Cell Group (MCG).

Optionally, the terminal configures a counter and a timer for the SCell, and configures a counter and a timer for the primary cell.

Configuring at least one of the counter and the timer includes at least one of: resetting at least one of the counter and the timer configured by the terminal for the SCell or keeping at least one of the counter and the timer configured by the terminal for the SCell running, in a case that the SCell is activated, deactivated or reactivated; resetting at least one of the counter and the timer configured by the terminal for the primary cell or keeping at least one of the counter and the timer configured by the terminal for the primary cell running, in a case that the primary cell is reconfigured or changed; resetting at least one of the counter and the timer configured by the terminal for the SCell or keeping at least one of the counter and the timer configured by the terminal for the SCell running, in a case that the primary cell is reconfigured or changed; resetting at least one of a counter and a timer configured by the terminal for at least one cell in the SCG or keeping at least one of a counter and a timer configured by the terminal for at least one cell in the SCG running, in a case that the SCG is activated, configured, or reconfigured; resetting at least one of a counter and a timer configured by the terminal for at least one cell in the MCG or keeping at least one of a counter and a timer configured by the terminal for at least one cell in the MCG running, in a case that the MCG is reconfigured or changed; resetting at least one of a counter and a timer configured by the terminal for at least one cell in the SCG or keeping at least one of a counter and a timer configured by the terminal for at least one cell in the SCG running, in a case that the MCG is reconfigured or changed.

Optionally, the terminal configures a common counter and a common timer for the SCell and the primary cell.

Configuring at least one of the counter and the timer includes at least one of: resetting at least one of the counter and the timer or keeping at least one of the counter and the timer running, in a case that the SCell is activated, deactivated, or reactivated; resetting at least one of the counter and the timer or keeping at least one of the counter and the timer running, in a case that the primary cell is reconfigured or changed; or, resetting at least one of a counter and a timer configured by the terminal for at least one cell in the SCG, and/or, keeping at least one of a counter and a timer configured by the terminal for at least one cell in the SCG running, in a case that the SCG is activated, configured, or reconfigured; resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

Optionally, the cell includes multiple SCells, the terminal configures a common counter and a common timer for the multiple SCells. Configuring at least one of the counter and the timer includes at least one of: resetting at least one of the counter and the timer or keeping at least one of the counter and the timer running in a case that at least one SCell in the multiple SCells is activated, deactivated, or reactivated; resetting at least one of a counter and a timer configured by the terminal for at least one cell in the SCG, and/or, keeping at least one of a counter and a timer configured by the terminal for at least one cell in the SCG running in a case that the SCG is activated, configured, or reconfigured; resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

Optionally, stopping the specific operation includes at least one of: stopping monitoring a scrambled PDCCH in the SCell; stopping monitoring to a scrambled PDCCH in the primary cell; stopping a random access procedure used for beam failure recovery.

Optionally, stopping monitoring the scrambled PDCCH in the SCell includes: stopping, in a case that the beam failure recovery procedure is performed on at least one SCell in multiple SCells included in the cell, monitoring a scrambled PDCCH in one or more SCells. Stopping the random access procedure used for beam failure recovery includes: stopping, in a case that the beam failure recovery procedure is performed on the SCell, a random access procedure used for beam failure recovery in the S Cell; or stopping, in a case that the beam failure recovery procedure is performed on the primary cell, a random access procedure used for beam failure recovery in the primary cell; or stopping, in a case that the beam failure recovery procedure is performed on the SCell and the primary cell respectively, a random access procedure used for beam failure recovery in the SCell and the primary cell.

Optionally, stopping the random access procedure used for beam failure recovery in the SCell and in the primary cell includes at least one of: stopping sending a preamble in the SCell; stopping sending a preamble in the primary cell; stopping monitoring a msg2 of the random access procedure in the SCell; stopping monitoring a msg2 of the random access procedure in the primary cell; stopping sending a msg3 of the random access procedure in the SCell; stopping sending a msg3 of the random access procedure in the primary cell; stopping monitoring a msg4 of the random access procedure in the SCell; stopping monitoring a msg4 of the random access procedure in the primary cell.

Optionally, the scrambled PDCCH in the SCell includes: a PDCCH scrambled with a cell radio network temporary identifier (C-RNTI) in the SCell. The scrambled PDCCH in the primary cell includes a PDCCH scrambled with a C-RNTI in the primary cell.

Optionally, the primary cell includes at least one of: a primary cell PCell, a PCell in the MCG, a primary secondary cell (PSCell) in the SCG, and a special cell (SpCell).

The terminal may improve performance of the terminal in beam failure detection or beam failure recovery.

It should be understood that, in the embodiment of the present disclosure, the radio frequency unit 401 may be used for receiving and transmitting signals in processes of transmitting and receiving information or talking. Specifically, after the radio frequency unit 401 receives downlink data from a base station, and the downlink data is transferred by the radio frequency unit 401 to the processor 410 for processing; and additionally the radio frequency unit 401 sends uplink data to the base station. Generally, the radio frequency unit 401 includes, but is not limited to, an antenna, at least one amplifier, a transceiver, a coupler, a low noise amplifier, a duplexer, and the like. In addition, the radio frequency unit 401 may also communicate with a network and other devices through a wireless communication system.

The terminal provides a wireless broadband internet access to a user through the network module 402, such as helping the user to send and receive emails, browse web pages, access streaming media, and the like.

The audio output unit 403 may convert audio data received by the radio frequency unit 401 or the network module 402 or stored in the storage 409 into an audio signal and output the audio signal as sound. The audio output unit 403 may also provide audio output (e.g., a call signal reception sound, a message reception sound, etc.) related to a specific function performed by the terminal 400. The audio output unit 403 includes a speaker, a buzzer, a receiver, and the like.

The input unit 404 is used to receive an audio or video signal. The input unit 404 may include a graphic processor (Graphics Processing Unit, GPU) 4041 and a microphone 4042. The graphics processor 4041 processes image data of a still picture or a video obtained by an image capturing device such as a camera in a video capturing mode or an image capturing mode. The processed image frame may be displayed on the display unit 406. Image frames processed by the graphics processor 4041 may be stored in the storage 409 (or other storage media) or sent via the radio frequency unit 401 or the network module 402. The microphone 4042 may receive sound and be able to process such sound into audio data. The processed audio data may be converted, in a case of a telephone communication mode, into a format output that may be sent to a mobile communications base station via the radio frequency unit 401.

The terminal 400 also includes at least one sensor 405, such as a light sensor, a motion sensor, and other sensors. In particular, the light sensor includes an ambient light sensor and a proximity sensor, wherein the ambient light sensor may adjust brightness of the display panel 4061 according to brightness of ambient light. The proximity sensor may turn off the display panel 4061 and/or a backlight when the terminal 400 moves close to the ear. As one type of motion sensor, the accelerometer sensor can detect a value of an acceleration in each direction (generally the three axes directions), and can detect a magnitude and a direction of gravity when being stationary, can be used to recognize a posture of a mobile terminal (such as horizontal-vertical screen switching, a related game, a magnetometer posture calibration), a vibration-recognition related function (such as a pedometer, tapping), and the like. The sensor 405 may further include a fingerprint sensor, a pressure sensor, an iris sensor, a molecular sensor, a gyroscope, a barometer, a hygrometer, a thermometer, an infrared sensor, and the like, which will not be described herein.

The display unit 406 is used to display information inputted by the user or information provided to the user. The display unit 406 may include a display panel 4061 that may be configured in the form of a liquid crystal display (Liquid Crystal Display, LCD), an organic light-emitting diode (Organic Light-Emitting Diode, OLED), or the like.

The user input unit 407 may be used to receive inputted digital or character information and generate a key signal input related to user-setting and function control of the terminal. Specifically, the user input unit 407 includes a touch panel 4071 and other input devices 4072. The touch panel 4071, also referred to as a touch screen, may collect a touch operation (e.g., an operation of a user using any suitable object or accessory, such as a finger, stylus, or the like, on or near the touch panel 4071) of the user on or near the touch panel 4071. The touch panel 4071 may include two parts, i.e., a touch detection device and a touch controller. The touch detection device detects a touch orientation of the user, detects a signal brought about by a touch operation, transmits the signal to the touch controller, and the touch controller receives touch information from the touch detection device, converts the touch information into contact coordinates and sends the contact coordinates to the processor 410, and receives and executes commands from the processor 9410. In addition, the touch panel 4071 may be implemented in various types such as a resistance type, a capacitance type, an infrared ray, and a surface acoustic wave. The user input unit 407 may also include other input devices 4072 in addition to the touch panel 4071. Specifically, the other input devices 4072 may include, but are not limited to, a physical keyboard, function keys (such as volume control keys, switch keys, etc.), a trackball, a mouse, and a joystick, which will not be described herein.

Further, the touch panel 4071 may be overlaid on the display panel 4061, and after the touch panel 4071 detects a touch operation on or near the touch panel 4071, the touch operation is sent by touch panel 4071 to the processor 410 to determine the type of a touch event. The processor 410 then provides a corresponding visual output on the display panel 4061 according to the type of the touch event. Although in FIG. 4, the touch panel 4071 and the display panel 4061 are two separate components for implementing input and output functions of the terminal, the input and output functions of the terminal in some embodiments may be realized by integrating the touch panel 4071 with the display panel 4061, and the present disclosure is not limited thereto.

The interface unit 408 is an interface in which an external device is connected to the terminal 400. For example, the external device may include a wired or wireless headset port, an external power supply (or a battery charger) port, a wired or wireless data port, a memory card port, a port for connecting a device having an identification module, an audio input/output (I/O) port, a video I/O port, a headphone port, and so on. The interface unit 408 may be used to receive input (e.g., data information, power, etc.) from an external device and transmit the received input to one or more elements within the terminal 400 or may be used to transmit data between the terminal 400 and the external device.

The storage 409 may be used to store software programs and various types of data. The storage 409 may mainly include a storage program area and a storage data area, wherein, the storage program area may store an operating system, an application program required by at least one function (such as a sound playing function, an image playing function, etc.), and the like; the storage data area may store data (such as audio data, a phonebook, etc.) created according to a use condition of the mobile phone. In addition, the storage 409 may include a high speed random access memory, and may also include a non-transitory memory, such as at least one disk storage device, a flash memory device, or other volatile solid state storage device.

The processor 410 is a console of the terminal, connects various parts of the entirety of the terminal using various interfaces and lines, and executes various functions and processes data of the terminal by running or executing software programs and/or modules stored in the storage 409, and by calling data stored in the storage 409, thereby integrally monitoring the terminal. The processor 410 may include one or more processing units; optionally, the processor 410 may integrate an application processor and a modem processor, wherein the application processor primarily processes an operating system, a user interface, an application program, etc. The modem processor mainly handles wireless communication. It will be appreciated that the above-described modem processor may also not be integrated into the processor 410.

The terminal 400 may also include a power supply 411 (such as a battery) that supplies power to various components, optionally, the power supply 411 may be logically connected to the processor 410 via a power management system. Thus, functions such as charging, discharging, and power consumption management are managed by the power management system.

In addition, the terminal 400 includes some functional modules not shown, which will not be described here.

Optionally, an embodiment of the present disclosure further provides a terminal. The terminal includes a processor 410, a storage 409, a computer program stored in the storage 409 and executable by the processor 940, wherein when the computer program is executed by the processor 410, each process of the foregoing embodiments of the configuration method for beam failure is realized, and the same technical effect can be achieved. In order to avoid repetition, details thereof are not repeated here.

An embodiment of the present disclosure also provides a computer readable storage medium, a computer program is stored on the computer readable storage medium, and when the computer program is executed by a processor, the processor implements various processes in the method embodiment of the configuration method for beam failure provided in an embodiments of the present disclosure, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

It should be noted that such terms as "including", "comprising" or any other variation thereof herein are intended to encompass non-exclusive inclusions such that a process, method, article or device including a series of elements includes not only those elements, but also other elements that are not explicitly listed, or elements inherent to such a process, method, article or user equipment. An element after a statement "including" does not exclude presence of further identical elements in the process, method, article or device that includes the element, if without further limitation.

Through description of the above embodiments, those skilled in the art can clearly understand that the method of the above embodiments can be implemented by means of software plus a necessary general hardware platform, but of course, can also be implemented by hardware, but in many cases the former is better implementation. Based on this understanding, the essential part of the technical solutions of the present disclosure or a part that contributes to the prior art can be embodied in the form of a software product. The computer software product is stored in a storage medium (such as a ROM/RAM, a magnetic disk, an optical disk) and includes several instructions to make a terminal (which can be a mobile phone, a computer, a server, an air-conditioner, or a network device, etc.) execute the methods described in the various embodiments of the present disclosure.

The embodiments of the present disclosure are described above with reference to the accompanying drawings, but the present disclosure is not limited to the above-mentioned specific embodiments. The above-mentioned specific embodiments are only illustrative and not restrictive. Those of ordinary skill in the art, under enlightenment of the present disclosure, may make many forms without departing from the principle of the present disclosure and the protection scope of the claims, all of which fall within the protection scope of the present disclosure.

What is claimed is:

1. A configuration method for beam failure applied to a terminal, wherein the configuration method for beam failure comprises:
    receiving a notification signaling used to notify a change in a state of a cell, a cell group, or a carrier group;
    configuring at least one of a counter and a timer according to the change in the state of the cell, the cell group, or the carrier group, and/or, stopping a specific operation during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group,
    wherein,
    the change in the state of the cell comprises the cell being activated, the cell being deactivated, the cell being reactivated, or the cell being changed;
    the change in the state of the cell group comprises the cell group being activated, the cell group being configured, the cell group being reconfigured, or the cell group being changed;
    the change in the state of the carrier group comprises the carrier group being activated, the carrier group being deactivated, the carrier group being reactivated, or the carrier group being changed;
    wherein the cell comprises at least one of a Secondary Cell (SCell) and a primary cell, and the cell group is at least one of a Secondary Cell Group (SCG) and a Master Cell Group (MCG).

2. The method according to claim 1, wherein, the terminal configures a counter and a timer for the SCell, and configures a counter and a timer for the primary cell;
    configuring at least one of the counter and the timer comprises at least one of following:
    resetting at least one of the counter and the timer configured by the terminal for the SCell or keeping at least one of the counter and the timer configured by the terminal for the SCell running, in a case that the SCell is activated, deactivated or reactivated;
    resetting at least one of the counter and the timer configured by the terminal for the primary cell or keeping at least one of the counter and the timer configured by the terminal for the primary cell running, in a case that the primary cell is reconfigured or changed;
    resetting at least one of the counter and the timer configured by the terminal for the SCell or keeping at least one of the counter and the timer configured by the terminal for the SCell running, in a case that the primary cell is reconfigured or changed;
    resetting at least one of a counter and a timer configured by the terminal for at least one cell in the SCG or keeping at least one of a counter and a timer configured by the terminal for at least one cell in the SCG running, in a case that the SCG is activated, configured, or reconfigured;
    resetting at least one of a counter and a timer configured by the terminal for at least one cell in the MCG or keeping at least one of a counter and a timer configured by the terminal for at least one cell in the MCG running, in a case that the MCG is reconfigured or changed;
    resetting at least one of a counter and a timer configured by the terminal for at least one cell in the SCG or keeping at least one of a counter and a timer configured by the terminal for at least one cell in the SCG running, in a case that the MCG is reconfigured or changed.

3. The method according to claim 1, wherein, the terminal configures a common counter and a common timer for the SCell and the primary cell,
    configuring at least one of the counter and the timer comprises at least one of following:
    resetting at least one of the counter and the timer or keeping at least one of the counter and the timer running, in a case that the SCell is activated, deactivated, or reactivated;
    resetting at least one of the counter and the timer or keeping at least one of the counter and the timer running, in a case that the primary cell is reconfigured or changed; or,
    resetting at least one of a counter and a timer configured by the terminal for at least one cell in the SCG, and/or, keeping at least one of a counter and a timer configured by the terminal for at least one cell in the SCG running, in a case that the SCG is activated, configured, or reconfigured;
    resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

4. The method according to claim 1, wherein, the cell comprises multiple SCells, the terminal configures a common counter and a common timer for the multiple SCells;
    configuring at least one of the counter and the timer comprises at least one of following:
    resetting at least one of the counter and the timer or keeping at least one of the counter and the timer running, in a case that at least one SCell in the multiple SCells is activated, deactivated, or reactivated;
    resetting at least one of a counter and a timer configured by the terminal for at least one cell in the SCG, and/or, keeping at least one of a counter and a timer configured by the terminal for at least one cell in the SCG running, in a case that the SCG is activated, configured, or reconfigured;
    resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

5. The method according to claim 1, wherein, stopping the specific operation comprises at least one of following:
    stopping monitoring a scrambled Physical Downlink Control Channel (PDCCH) in the SCell;
    stopping monitoring to a scrambled PDCCH in the primary cell;
    stopping a random access procedure used for beam failure recovery.

6. The method according to claim 5, wherein, stopping monitoring the scrambled PDCCH in the SCell comprises:
    stopping, in a case that the beam failure recovery procedure is performed on at least one SCell in multiple SCells comprised in the cell, monitoring a scrambled PDCCH in one or more SCells;
    stopping the random access procedure used for beam failure recovery comprises:
        stopping, in a case that the beam failure recovery procedure is performed on the SCell, a random access procedure used for beam failure recovery in the SCell; or
        stopping, in a case that the beam failure recovery procedure is performed on the primary cell, a random access procedure used for beam failure recovery in the primary cell; or
        stopping, in a case that the beam failure recovery procedure is performed on the SCell and the primary cell respectively, a random access procedure used for beam failure recovery in the SCell and the primary cell.

7. The method according to claim 6, wherein, stopping the random access procedure used for beam failure recovery in the SCell and in the primary cell comprises at least one of following:
    stopping sending a preamble in the SCell;
    stopping sending a preamble in the primary cell;
    stopping monitoring a message 2 (msg2) of the random access procedure in the SCell;
    stopping monitoring a msg2 of the random access procedure in the primary cell;
    stopping sending a msg3 of the random access procedure in the SCell;
    stopping sending a msg3 of the random access procedure in the primary cell;
    stopping monitoring a msg4 of the random access procedure in the SCell;
    stopping monitoring a msg4 of the random access procedure in the primary cell.

8. The method according to claim 5, wherein, the scrambled PDCCH in the SCell comprises a PDCCH scrambled with a Cell Radio Network Temporary Identifier (C-RNTI) in the SCell;
    the scrambled PDCCH in the primary cell comprises a PDCCH scrambled with a C-RNTI in the primary cell.

9. The method according to claim 1, wherein, the primary cell comprises at least one of:
    a Primary Cell (PCell), a PCell in the MCG, a Primary Secondary Cell (PSCell) in the SCG, and a Special Cell (SpCell).

10. A terminal, comprising:
    a storage, a processor, and a program stored on the storage and executable by the processor, wherein in a case that the computer program is executed by the processor, the processor implements a configuration method for beam failure, the configuration method for beam failure comprises:
    receiving a notification signaling used to notify a change in a state of a cell, a cell group, or a carrier group;
    configuring at least one of a counter and a timer according to the change in the state of the cell, the cell group, or the carrier group, and/or, stopping a specific operation during a beam failure recovery procedure according to the change in the state of the cell, the cell group, or the carrier group, wherein the counter and the timer are a counter and a timer used for beam failure detection and configured by the terminal for the cell or a cell in the cell group or a cell in a carrier group,
    wherein,
    the change in the state of the cell comprises the cell being activated, the cell being deactivated, the cell being reactivated, or the cell being changed;
    the change in the state of the cell group comprises the cell group being activated, the cell group being configured, the cell group being reconfigured, or the cell group being changed;
    the change in the state of the carrier group comprises the carrier group being activated, the carrier group being deactivated, the carrier group being reactivated, or the carrier group being changed;
    wherein the cell comprises at least one of a Secondary Cell (SCell) and a primary cell, and the cell group is at least one of a Secondary Cell Group (SCG) and a Master Cell Group (MCG).

11. The terminal according to claim 10, wherein, the terminal configures a counter and a timer for the SCell, and configures a counter and a timer for the primary cell;
    configuring at least one of the counter and the timer comprises at least one of following:
    resetting at least one of the counter and the timer configured by the terminal for the SCell or keeping at least one of the counter and the timer configured by the terminal for the SCell running, in a case that the SCell is activated, deactivated or reactivated;
    resetting at least one of the counter and the timer configured by the terminal for the primary cell or keeping at least one of the counter and the timer configured by the terminal for the primary cell running, in a case that the primary cell is reconfigured or changed;
    resetting at least one of the counter and the timer configured by the terminal for the SCell or keeping at least one of the counter and the timer configured by the terminal for the SCell running, in a case that the primary cell is reconfigured or changed;
    resetting at least one of a counter and a timer configured by the terminal for at least one cell in the SCG or keeping at least one of a counter and a timer configured by the terminal for at least one cell in the SCG running, in a case that the SCG is activated, configured, or reconfigured;
    resetting at least one of a counter and a timer configured by the terminal for at least one cell in the MCG or keeping at least one of a counter and a timer configured by the terminal for at least one cell in the MCG running, in a case that the MCG is reconfigured or changed;
    resetting at least one of a counter and a timer configured by the terminal for at least one cell in the SCG or keeping at least one of a counter and a timer configured by the terminal for at least one cell in the SCG running, in a case that the MCG is reconfigured or changed.

12. The terminal according to claim 10, wherein, the terminal configures a common counter and a common timer for the SCell and the primary cell;
configuring at least one of the counter and the timer comprises at least one of following:
resetting at least one of the counter and the timer or keeping at least one of the counter and the timer running, in a case that the SCell is activated, deactivated, or reactivated;
resetting at least one of the counter and the timer or keeping at least one of the counter and the timer running, in a case that the primary cell is reconfigured or changed; or,
resetting at least one of a counter and a timer configured by the terminal for at least one cell in the SCG, and/or, keeping at least one of a counter and a timer configured by the terminal for at least one cell in the SCG running, in a case that the SCG is activated, configured, or reconfigured;
resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

13. The terminal according to claim 10, wherein, the cell comprises multiple SCells, the terminal configures a common counter and a common timer for the multiple SCells;
configuring at least one of the counter and the timer comprises at least one of following:
resetting at least one of the counter and the timer or keeping at least one of the counter and the timer running, in a case that at least one SCell in the multiple SCells is activated, deactivated, or reactivated;
resetting at least one of a counter and a timer configured by the terminal for at least one cell in the SCG, and/or, keeping at least one of a counter and a timer configured by the terminal for at least one cell in the SCG running, in a case that the SCG is activated, configured, or reconfigured;
resetting at least one of a counter and a timer configured by the terminal for at least one cell in the SCG, and/or, keeping at least one of a counter and a timer configured by the terminal for at least one cell in the SCG running, in a case that the MCG is reconfigured or changed.

14. The terminal according to claim 10, wherein, stopping the specific operation comprises at least one of following:
stopping monitoring a scrambled Physical Downlink Control Channel (PDCCH) in the SCell;
stopping monitoring to a scrambled PDCCH in the primary cell;
stopping a random access procedure used for beam failure recovery.

15. The terminal according to claim 14, wherein,
stopping monitoring the scrambled PDCCH in the SCell comprises:
stopping, in a case that the beam failure recovery procedure is performed on at least one SCell in multiple SCells comprised in the cell, monitoring a scrambled PDCCH in one or more SCells;
stopping the random access procedure used for beam failure recovery comprises:
stopping, in a case that the beam failure recovery procedure is performed on the SCell, a random access procedure used for beam failure recovery in the SCell; or
stopping, in a case that the beam failure recovery procedure is performed on the primary cell, a random access procedure used for beam failure recovery in the primary cell; or
stopping, in a case that the beam failure recovery procedure is performed on the SCell and the primary cell respectively, a random access procedure used for beam failure recovery in the SCell and the primary cell.

16. The terminal according to claim 15, wherein, stopping the random access procedure used for beam failure recovery in the SCell and in the primary cell comprises at least one of following:
stopping sending a preamble in the SCell;
stopping sending a preamble in the primary cell;
stopping monitoring a message 2 (msg2) of the random access procedure in the SCell;
stopping monitoring a msg2 of the random access procedure in the primary cell;
stopping sending a msg3 of the random access procedure in the SCell;
stopping sending a msg3 of the random access procedure in the primary cell;
stopping monitoring a msg4 of the random access procedure in the SCell;
stopping monitoring a msg4 of the random access procedure in the primary cell.

17. The terminal according to claim 14, wherein, the scrambled PDCCH in the SCell comprises a PDCCH scrambled with a Cell Radio Network Temporary Identifier (C-RNTI) in the SCell;
the scrambled PDCCH in the primary cell comprises a PDCCH scrambled with a C-RNTI in the primary cell.

18. The terminal according to claim 10, wherein, the primary cell comprises at least one of:
a Primary Cell (PCell), a PCell in the MCG, a Primary Secondary Cell (PSCell) in the SCG, and a Special Cell (SpCell).

* * * * *